United States Patent
Lin

(12) 
(10) Patent No.: US 6,456,774 B1
(45) Date of Patent: Sep. 24, 2002

(54) ADJUSTABLE ATTENUATION ADAPTER FOR FIBER OPTIC CONNECTOR

(75) Inventor: I-En Lin, Mounli (TW)

(73) Assignee: Rich Key Technologies Limited, Mounli (TW)

( * ) Notice: Subject to any disclaimer, the term of this patent is extended or adjusted under 35 U.S.C. 154(b) by 121 days.

(21) Appl. No.: 09/630,282

(22) Filed: Aug. 1, 2000

(51) Int. Cl.[7] .................................................. G02B 6/00
(52) U.S. Cl. ......................................... 385/140; 385/62
(58) Field of Search ............................. 385/140, 60, 72, 385/73, 62

(56) References Cited

U.S. PATENT DOCUMENTS 6,095,694 A  *  8/2000  Chudoba et al. ............... 385/62
6,256,446 B1 *  7/2001  Brunsting et al. .......... 385/140

* cited by examiner

Primary Examiner—Cassandra Spyrou
Assistant Examiner—Euncha Cherry
(74) Attorney, Agent, or Firm—Intellectual Property Solution, PLLC

(57) ABSTRACT

An adjustable attenuation adapter mainly comprises a fixing body having a bore centrally disposed therethrough and a connecting member extending outwardly from the bore; a moving body having a cylindrical body with a threaded outer surface; an inner roller being disposed within the central bore of the fixing body, the inner roller having an outer surface with gear teeth and an inner threaded surface for driving the threaded outer surface of the cylindrical body of the moving body; and an adjusting knob disposed within the fixing body and adjacent to the inner roller, the adjusting knob having a gear body for driving gear teeth of the inner roller. Since the threaded outer surface of the cylindrical body is threadedly driven by the inner threaded surface of the inner roller which is also gearedly rotated by the adjusting knob, the rotation of the adjusting knob causes the axial displacement of the moving body with respect to the fixing body.

20 Claims, 6 Drawing Sheets

ADJUSTABLE ATTENUATION ADAPTER FOR FIBER OPTIC CONNECTOR

BACKGROUND OF THE INVENTION

1. Field of the Invention

This invention relates generally to the field of fiber optic signal transmission coupling devices used to interconnect a pair of terminated optical fibers for light transmission therethrough, and more particularly to an adjustable attenuation adapter for fiber optic connectors for varying the air gap between the ends of the aligned terminated optical fibers in a controlled manner to provide variable optical attenuation to a transmitted signal.

2. Description of the Related Art

Attenuators are used in fiber optic systems to reduce the optical power received by the photodetector to a level that is within the dynamic range of the optical receiver. The light intensity control of laser diodes and LEDs is limited in dynamic range and can result in an undesired change in radiation pattern, modal structure and central wavelength. Light intensity control at the transmitter has the additional disadvantage of requiring either remote power monitoring at the destination central office receiver or loop-back. Therefore, for interoffice transmission applications, attenuators are normally employed at the destination central office. immediately in front the receiver.

Attenuators of fixed type are often adequate to adjust the received power level to within the required range. Attenuators of variable type are useful for periodic adjustment of received power should the link loss output increase or decrease during the life of the transmission system. Increased link loss may be caused by degradation of the fiber, splices, or optical connectors. In additions, variable attenuators are also important for optical measurements, such as BER as a function of received power, which are important for characterizing the performance of transmission systems.

There are mainly three different types of designs of optical-fiber attenuators: mechanical attenuators, see A. Benner, H. M. Presby. and N. Amitay, "Low-reflection in-line variable attenuator utilizing optical fiber taper," J. of Lightwave Technology, Vol. 8, No. 1, pp. 7–10, January, 1990, laser diode attenuators, see N. Kashima, "A new approach to an optical attenuator for a time compression multiplex system using a laser diode as both transmitter and receiver", J. of Lightwave Technology, Vol. 9, No. 8, pp. 987–990, August, 1991, and fused attenuators, see e.g. M. Cork, "Passive fiber optic components," Short Course Notes, OFC'91, San Diego, p. 63, February, 1991.

In the prior art, there exist a variety of structures for introducing variable attenuation. Some structures include a wheel having a plurality of neutral density filters which are selectively introduced into the gap. Others employ a movably mounted reflective surface. Still other methods employ heating and twisting of the fibers. U.S. Pat. No. 4,145,110 granted Mar. 20, 1979 to Otti Szentesi, discloses a relatively low-cost device to accomplish this purpose in which a connecting structure firmly holds one terminated fiber in relatively fixed position, while varying the other fiber using a threaded nut toward and away from the fixed fiber to vary the distance therebetween. While not without utility, the construction is rather large in overall size, precluding use of the same in an area where space limitations are critical, and the construction employs parts which are not easily manufactured using mass production techniques, such as die castings.

U.S. Pat. No. 5,187,768 granted Feb. 16, 1993 to Ott, et al., discloses a fiber optic connector having an adjustable element providing for optical signal attenuation. The connector includes a pair of plug connector elements maintained in axially aligned relation upon engagement with a medially positioned adapter element. One of the plug connector elements incorporates the adjustable element, movement of which varies the gap existing between the aligned ends of the optical fibers without relative rotation between the end surfaces of the fibers. However, the construction is difficult to adjust an desired attenuation and employs parts which are not easily manufactured.

SUMMARY OF THE INVENTION

It is a primary object of the present invention to provide an adjustable attenuation adapter for fiber optic connector for easily varying the air gap between the ends of the aligned terminated optical fibers to provide variable optical attenuation to a transmitted signal.

It is another object of the present invention to provide an adjustable attenuation adapter for fiber optic connector which is rather compact overall so as to be employed in an area where space limitations are critical.

It is a further object of the present invention to provide an adjustable attenuation adapter for fiber optic connector which is easy to adjust an desired attenuation.

According to the present invention, the adjustable attenuation adapter mainly comprises a fixing body, a moving body, a fixing plate, an adjusting knob, and a fixing knob. The fixing body includes a plate, a bore centrally disposed in the plate, and a threaded connecting member extending outwardly from the bore. The moving body includes a cylindrical body extending between a larger end and a smaller end having an orificed end wall. The cylindrical body has a threaded outer surface to be threadedly driven by an inner roller and the larger end has a threaded outer surface to be threadedly engaged with a plug connector element. An alignment sleeve serves to engage the ferrule on each of the first and second plug elements and maintain axial alignment therebetween. The alignment sleeve is positioned within the moving body and is enclosed by a sleeve cap having an orificed end wall. The fixing plate includes a plate and a bore centrally disposed therethrough. The adjusting knob is sandwiched between the fixing body and the fixing plate. The inner roller has an outer surface with gear teeth to be driven by the gear body of the adjusting knob and an inner threaded surface for driving the threaded outer surface of the cylindrical body of the moving body. The inner roller is sandwiched between the fixing body and the fixing plate. A fixing knob controls the position of the detent with respect to the inner roller.

The adjustable attenuation adapter serves to interconnect the FC-type plug elements of fiber optic connectors. When the ferrules and of the first and second plug elements are in substantially abutted condition, minimum optical attenuation is obtained. Where greater attenuation is required, the fixing knob is rotated in a manner that the fixing knob does not press the detnet against the inner roller. Then, the adjusting knob is rotated such that the gear body drives the gear teeth of the inner roller to rotate. The rotation of the inner roller causes the axial displacement of the moving body with respect to the fixing body and the fixing plate. When the moving body is moved away from the fixing body, the ferrule of the second plug element is also moved away from the ferrule of the first plug element and thus an air gap exists between the two ferrules and of the first and second plug elements and, which results in greater optical attenuation.

Briefly stated, the invention contemplates the provision of an improved construction of the type described in which the above-mentioned disadvantages have been substantially eliminated. Adjustment is performed by manually rotating the adjusting knob forming a part of the attenuator which results in the longitudinal displacement of an optical fiber in one of the plug connectors with respect to the other, without, in any manner, disturbing the relative angular relation of the optical fibers, and without, in any manner, effecting any lateral displacement of the axis of either optical fiber.

BRIEF DESCRIPTION OF THE DRAWINGS

Other objects, advantages, and novel features of the invention will become more apparent from the following detailed description when taken in conjunction with the accompanying drawings.

DETAILED DESCRIPTION OF THE PREFERRED EMBODIMENTS

Figure 1:
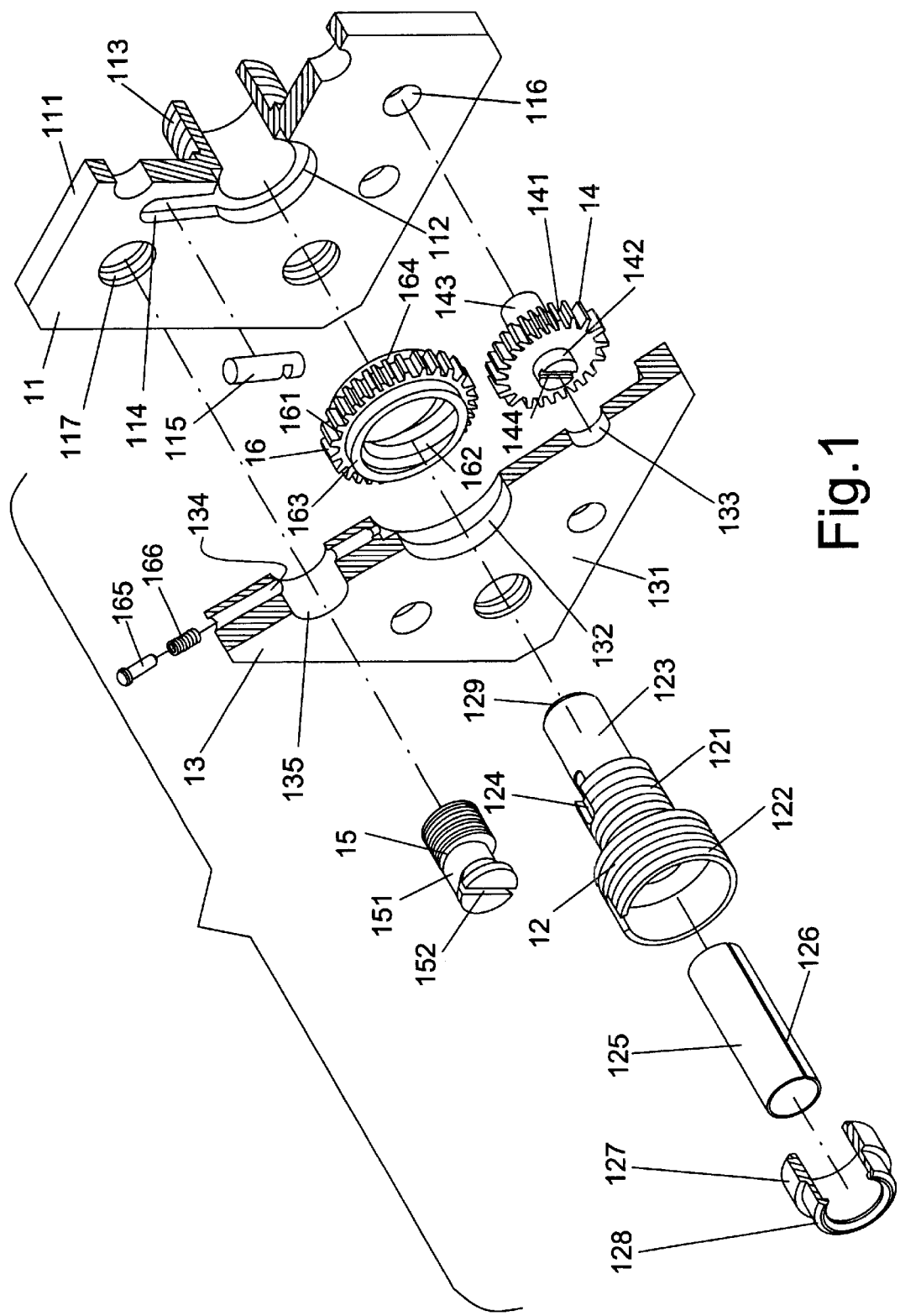
FIG. 1 is an exploded view of the adjustable attenuation adapter for fiber optic connector in accordance with a first embodiment of the present invention.

Referring to FIG. 1, the adjustable attenuation adapter 10 of the present invention mainly comprises a fixing body 11, a moving body 12, a fixing plate 13, an adjusting knob 14, and a fixing knob 15. The fixing body 11 includes a rectangularly-shaped plate 111, a bore 112 centrally disposed in the rectangularly-shaped plate 111, and a threaded connecting member 113 extending outwardly from the bore 112. The rectangularly-shaped plate 111 has a groove 114 communicating with the bore 112 for receiving a key 115. It should be noted that the rectangular shape is a preferable shape for the plate 111. However, other shape, such as oblong, can be employed for the plate 111 for the present invention. The moving body 12 includes a cylindrical body 121 extending between a larger end 122 and a smaller end 123 having an orificed end wall 129. The cylindrical body 121 has a threaded outer surface to be threadedly driven by an inner roller 16 and the larger end 122 has a threaded outer surface to be threadedly engaged with a plug connector element. An oblong key slot 124 is formed at the cylindrical body 121 and the smaller end 123 for receiving the key 115. An alignment sleeve 125 serves to engage the ferrule on each of the first and second plug elements and maintain axial alignment therebetween. A longitudinal slot 126 is formed in the alignment sleeve 125 for permitting resilient radial expansion and contraction. The alignment sleeve 125 is inserted into the moving body 12 and is enclosed by a sleeve cap 127 having an orificed end wall 128. Accordingly, the alignment sleeve 125 is bounded by the orificed end wall 129 of the moving body 12 and the orificed end wall 128 of the sleeve cap 127. The fixing plate 13 includes a rectangularly-shaped plate 131 and a bore 132 centrally disposed therethrough. It should be noted that the rectangular shape is a preferable shape for the plate 131. However, other shape, such as oblong, can be employed for the plate 131 for the present invention. The adjusting knob 14 is consisted of a gear body 141 with two fixing axles 142 and 143. The adjusting knob 14 is sandwiched between the fixing body 11 and the fixing plate 13 with the fixing axle 142 rotatably disposed within the hole 133 of the fixing plate 13 and the fixing axle 143 rotatably disposed within the hole 116 of the fixing body 11. The inner roller 16 has an outer surface with gear teeth 161 to be driven by the gear body 141 of the adjusting knob 14 and an inner threaded surface 162 for driving the threaded outer surface of the cylindrical body 121 of the moving body 12. The inner roller 16 is sandwiched between the fixing body 11 and the fixing plate 13 with the flange 163 rotatably disposed within the bore 132 of the fixing plate 13 and the flange 164 rotatably disposed within the bore 112 of the fixing body 11. A through hole 134 is formed within the fixing plate 13 to communicate with the bore 132 and a detent 165 with a return spring 166 is disposed within the through hole 134. A fixing knob 15 is inserted through a hole 135 of the fixing plate 13 and threadedly engaged with the threaded hole 117 of the fixing body 11. The cam surface 151 of the fixing knob 15 will control the position of the detent 165 with respect to the inner roller 16, which will be described in more detail below.

Figure 2:
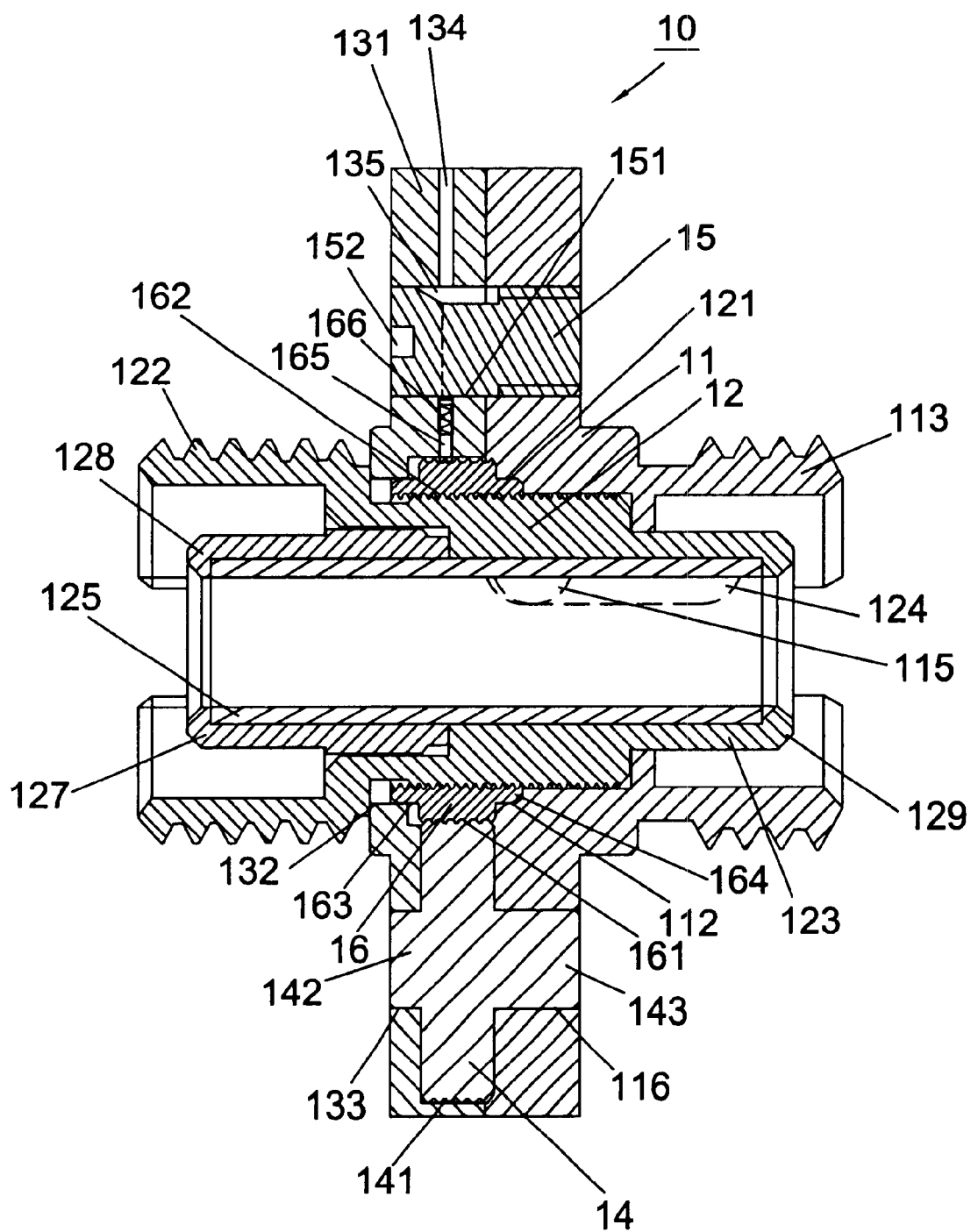
FIG. 2. is a longitudinal central sectional view of the first embodiment of the present invention.

Referring to FIG. 2, it illustrates a longitudinal central sectional view of the adjustable attenuation adapter 10 in accordance with the first embodiment of the present invention. The adjusting knob 14 is sandwiched between the fixing body 11 and the fixing plate 13 with the fixing axle 142 rotatably disposed within the hole 133 of the fixing plate 13 and the fixing axle 143 rotatably disposed within the hole 116 of the fixing body 11. The inner roller 16 is also sandwiched between the fixing body 11 and the fixing plate 13 with the flange 163 rotatably disposed within the bore 132 of the fixing plate 13 and the flange 164 rotatably disposed within the bore 112 of the fixing body 11. The cylindrical body 121 of the moving body 12 is threaded into the inner threaded surface 162 of the inner roller 16. The inner roller 16 has an outer surface with gear teeth 161 to be driven by the gear body 141 of the adjusting knob 14 and an inner threaded surface 162 for driving the threaded outer surface of the cylindrical body 121 of the moving body 12. The key 115 extends into the oblong slot 124 and serves to prevent rotational motion of the moving body 12 with respect to the fixing body 11. The alignment sleeve 125 is disposed with the moving body 12 with one end bonded by the orificed end wall 129 of the smaller end 123 and the other end by the orificed end wall 128 of the sleeve cap 127. The detent 165 together with a return spring 166 is disposed within the through hole 134 and a fixing knob 15 is inserted through a hole 135 of the fixing plate 13 and threadedly engaged with the threaded hole 117 of the fixing body 11. The cam surface 151 of the fixing knob 15 presses the detent 165 against the inner roller 16 to prevent the inner roller 16 from rotation.

Figure 3:
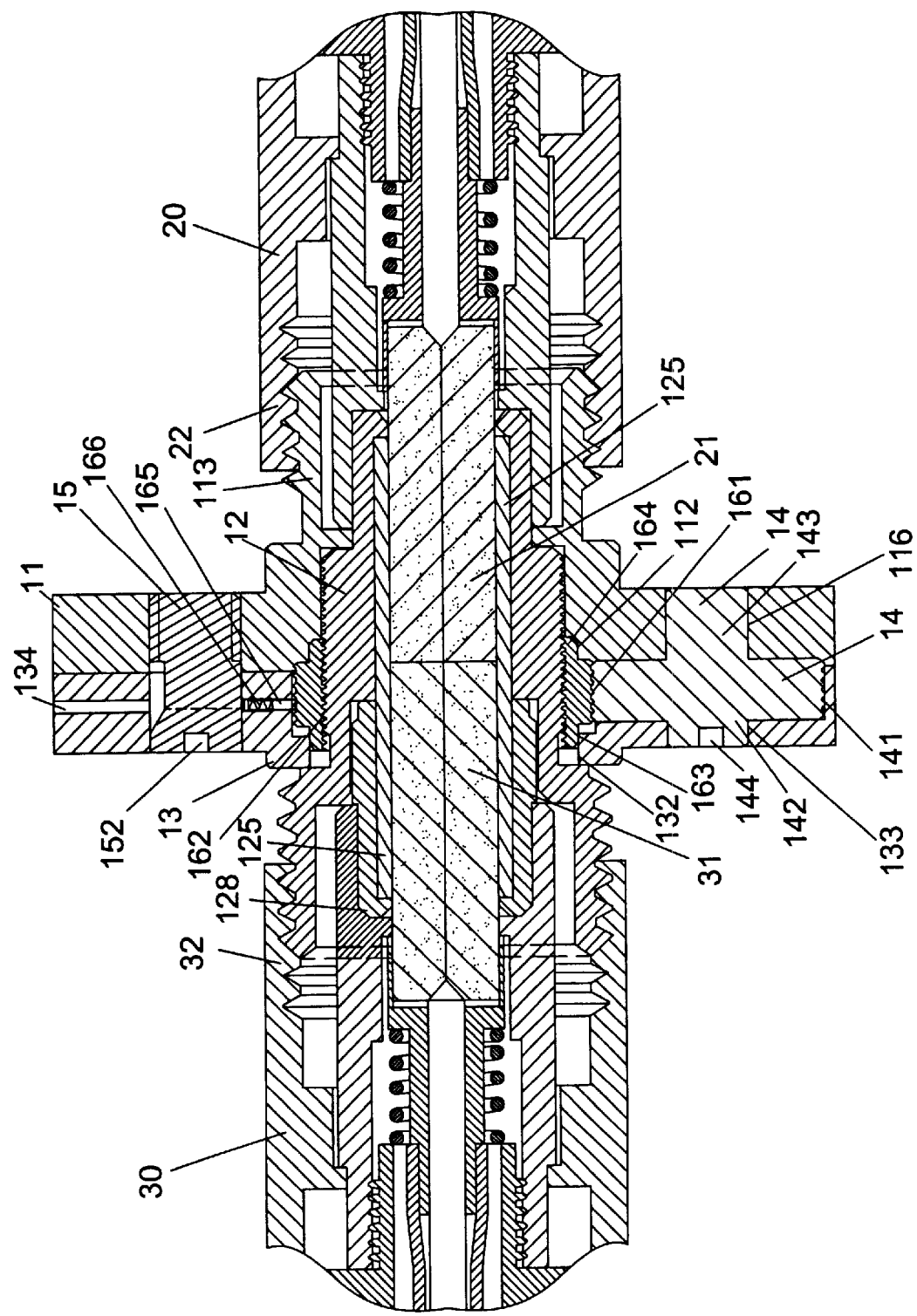
FIG. 3 is a longitudinal central sectional view of the first embodiment of the present invention, illustrating the optical fibers of the first and second plug connectors in substantially abutted condition wherein minimum optical attenuation is obtained.

FIG. 3 illustrates that the adjustable attenuation adapter 10 serves to interconnect the plug elements 20 and 30 of so-called FC type, wherein the ferrule 21 of the first plug element 20 is inserted into the alignment sleeve 125 and then the connector housing 22 of the first plug element 20 is threadedly engaged with the threaded connecting member 113 of the fixing body 11, and the ferrule 31 of the second plug element 30 is inserted into the alignment sleeve 125 and then the connector housing 32 of the second plug element 30 is threadedly engaged with the larger end 122 of the moving body 12. The alignment sleeve 125 serves to engage the ferrules 21 and 31 on each of the first and second plug elements 20 and 30 and maintain axial alignment therebetween. The ferrules 21 and 31 are frictionally engaged within this common alignment sleeve 125, thus, the concentricity between the transmitted fibers (within the ferrules) and the outside diameter of both ferrules relative to each other is maintained. The spring characteristics of the alignment sleeve 125 assure retention of the interference fit during axial movement of the ferrule 31 of the second plug element 30. In this case, the ferrules 21 and 31 of the first and second plug elements 20 and 30 are in substantially abutted condition wherein minimum optical attenuation is obtained.

Figure 4:
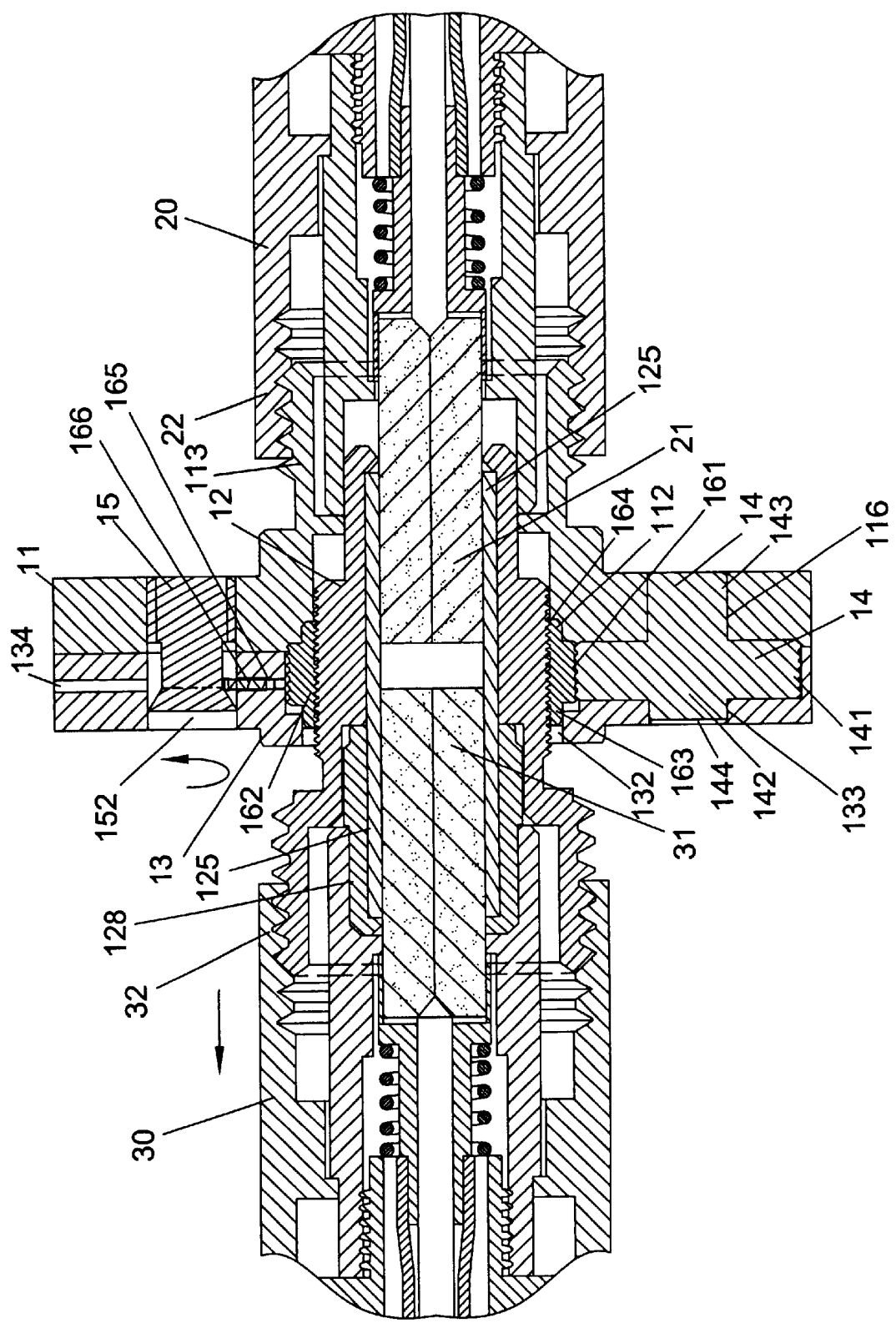
FIG. 4 is a longitudinal central sectional view of the first embodiment of the present invention, illustrating the optical fibers of the first and second plug connectors in substantially separated condition wherein an greater optical attenuation is obtained.

FIG. 4 illustrates the ferrules 21 and 31 of the first and second plug connectors 20 and 30 in substantially separated condition wherein an greater optical attenuation is obtained. Where greater attenuation is required, the fixing knob 15 is rotated by a screwdriver at the slot 152 in a manner that the cam surface 151 does not press the detnet 165 against the inner roller 16 such that the inner roller can rotate freely. Then, the adjusting knob 14 is rotated by a screwdriver at the slot 144 such that the gear body 141 drives the gear teeth 161 of the inner roller 16 to rotate. Since the threaded outer surface of the cylindrical body 121 is threadedly driven by the inner threaded surface 162 of the inner roller 16, the rotation of the inner roller 16 causes the axial displacement of the moving body 12 with respect to the fixing body 11 and the fixing plate 13. As shown in FIG. 4, when the adjusting knob 14 is rotated, the moving body 12 is moved away from the fixing body 11 and an air gap exists between the two ferrules 21 and 31 of the first and second plug elements 20 and 30, which results in greater optical attenuation. Normally, the adjusting knob 14 will be rotated in relatively small increments with a test of light transmission being performed between these increments until the desired degree of attenuation is obtained. At this point, the fixing knob 15 is again rotated to activate the cam surface 151 to press detnet 165 against the inner roller 16 to secure the adjustment.

Figure 5:
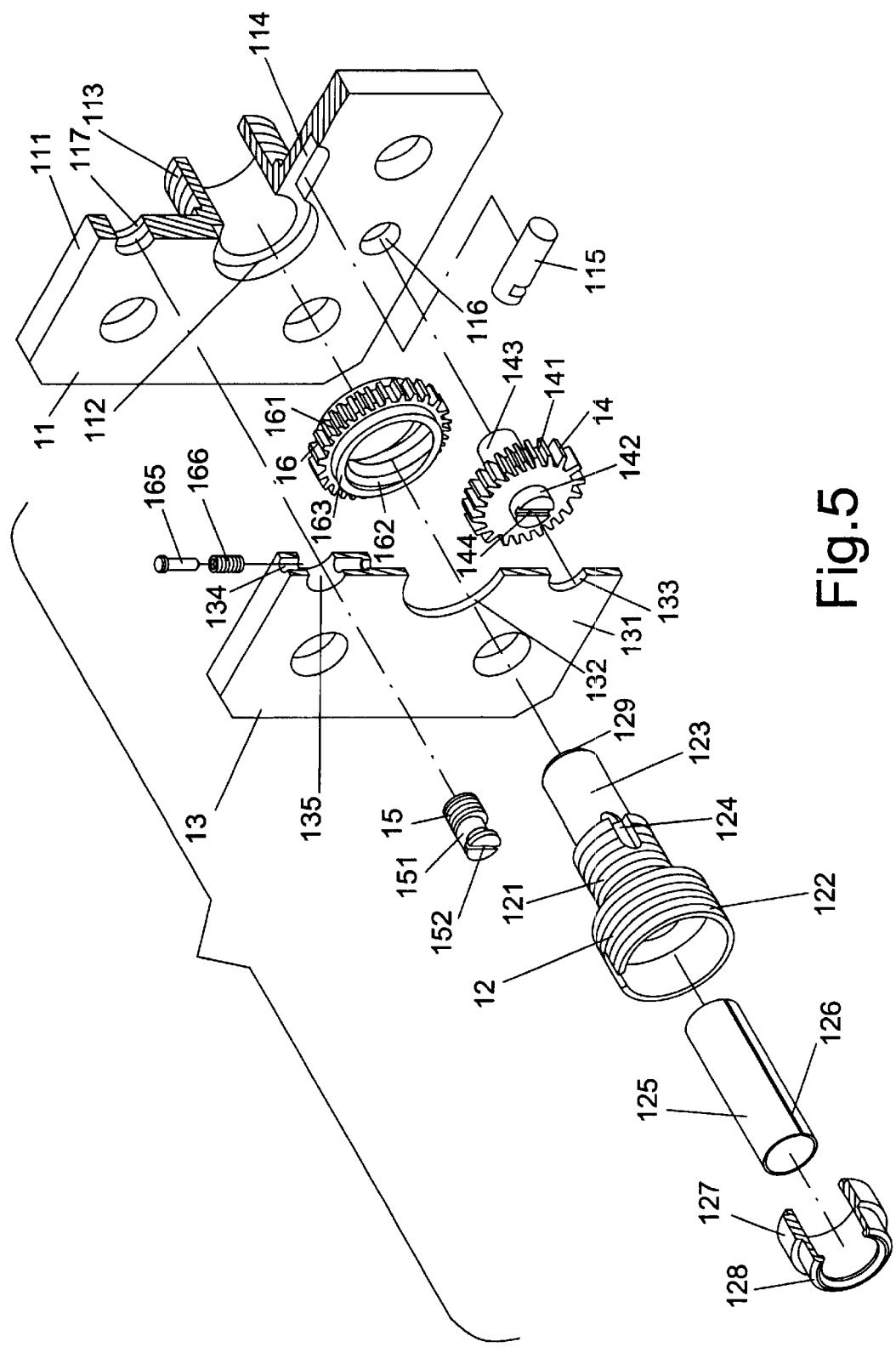
FIG. 5 is an exploded view of the adjustable attenuation adapter for fiber optic connector in accordance with a second embodiment of the present invention.
Figure 6:
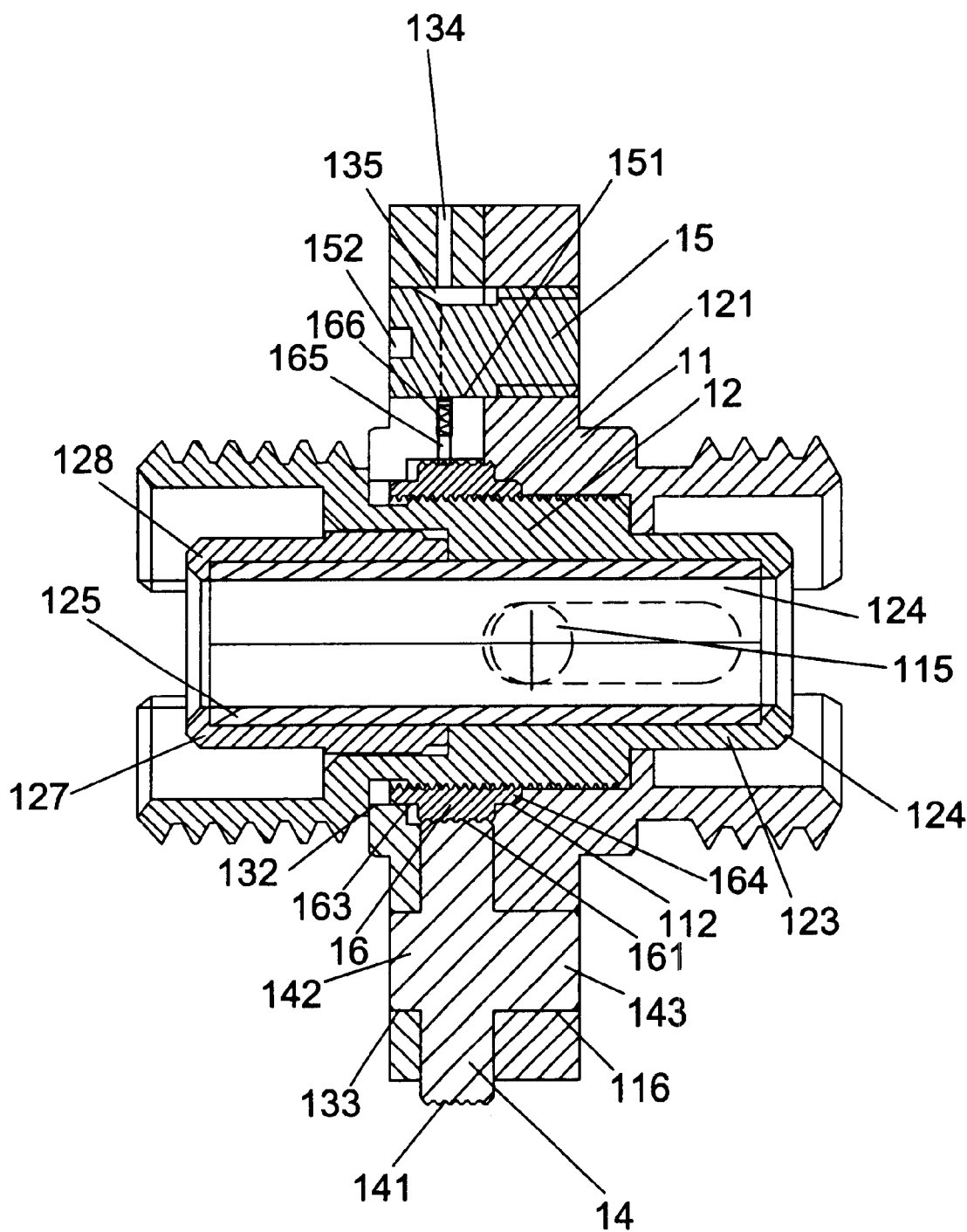
FIG. 6 is a longitudinal central sectional view of the second embodiment of the present invention.

FIGS. 5 and 6 illustrate an adjustable attenuation adapter for fiber optic connector in accordance with a second embodiment of the present invention. The adjustable attenuation adapter 10 mainly comprises a fixing body 11, a moving body 12, a fixing plate 13, an adjusting knob 14, and a fixing knob 15. The fixing body 11 includes a rectangularly-shaped plate 111, a bore 112 centrally disposed in the rectangularly-shaped plate 111, and a threaded connecting member 113 extending outwardly from the bore 112. The rectangularly-shaped plate 111 has a groove 114 communicating with the bore 112 for receiving a key 115. The moving body 12 includes a cylindrical body 121 extending between a larger end 122 and a smaller end 123 having an orificed end wall 129. The cylindrical body 121 has a threaded outer surface to be threadedly driven by an inner roller 16 and the larger end 122 has a threaded outer surface to be threadedly engaged with a plug connector element. An oblong key slot 124 is formed at the cylindrical body 121 and the smaller end 123 for receiving the key 115. An alignment sleeve 125 serves to engage the ferrule on each of the first and second plug elements and maintain axial alignment therebetween. A longitudinal slot 126 is formed in the alignment sleeve 125 for permitting resilient radial expansion and contraction. The alignment sleeve 125 is inserted into the moving body 12 and is enclosed by a sleeve cap 127 having an orificed end wall 128. Accordingly, the alignment sleeve 125 is bonded by the orificed end wall 129 of the moving body 12 and the orificed end wall 128 of the sleeve cap 127. The fixing plate 13 includes a rectangularly-shaped plate 131 and a bore 132 centrally disposed therethrough. The adjusting knob 14 is consisted of a gear body 141 with two fixing axles 142 and 143. The adjusting knob 14 is sandwiched between the fixing body 11 and the fixing plate 13 with the fixing axle 142 rotatably disposed within the hole 133 of the fixing plate 13 and the fixing axle 143 rotatably disposed within the hole 116 of the fixing body 11. The inner roller 16 has an outer surface with gear teeth 161 to be driven by the gear body 141 of the adjusting knob 14 and an inner threaded surface 162 for driving the threaded outer surface of the cylindrical body 121 of the moving body 12. The inner roller 16 is sandwiched between the fixing body 11 and the fixing plate 13 with the flange 163 rotatably disposed within the bore 132 of the fixing plate 13 and the flange 164 rotatably disposed within the bore 112 of the fixing body 11. A through hole 134 is formed within the fixing plate 13 to communicate with the bore 132 and a detent 165 with a return spring 166 is disposed within the through hole 134. A fixing knob 15 is inserted through a hole 135 of the fixing plate 13 and threadedly engaged with the threaded hole 117 of the fixing body 11. The cam surface 151 of the fixing knob 15 will control the position of the detent 165 with respect to the inner roller 16.

According to the second embodiment of the adjustable attenuation adapter 10 of the present invention, a portion of the gear body 141 of the adjusting knob 14 is exposed through the bottoms of the fixing body 11 and the fixing plate 13. Therefore, the user can directly rotate the gear body 141 by hand to adjust the optical attenuation.

Thus, the invention contemplates the provision of an improved construction of the type described in which the above-mentioned disadvantages have been substantially eliminated. Adjustment is performed by manually rotating the adjusting knob 14 forming a part of the attenuator 10 which results in the longitudinal displacement of the ferrule in one of the plug connectors with respect to the other, without, in any manner, disturbing the relative angular relation of the optical fibers, and without, in any manner, effecting any lateral displacement of the axis of either optical fiber. The present invention to provide adjustable attenuation adapters for easily varying the air gap between the ends of the aligned terminated optical fibers to provide variable optical attenuation to a transmitted signal. Further, the adjustable attenuation adapters of the present invention are rather compact overall so as to be employed in an area where space limitations are critical.

Although the invention has been explained in relation to its preferred embodiment, it is to be understood that many other possible modifications and variations can be made without departing from the spirit and scope of the invention as hereinafter claimed.

What is claimed is:

1. An adjustable attenuation adapter comprising:
   a fixing body having a bore centrally disposed therethrough and a connecting member extending outwardly from the bore;
   a moving body having a cylindrical body with a threaded outer surface;
   an inner roller being disposed within the central bore of the fixing body, the inner roller having an outer surface with a gear teeth and an inner threaded surface for driving the threaded outer surface of the cylindrical body of the moving body;

an adjusting knob disposed within the fixing body and adjacent to the inner roller, the adjusting knob having a gear body for driving the gear teeth of the inner roller;

wherein the threaded outer surface of the cylindrical body is threadedly driven by the inner threaded surface of the inner roller which is also gearedly rotated by the adjusting knob, the rotation of the adjusting knob causes an axial displacement of the moving body with respect to the fixing body.

2. The adjustable attenuation adapter as claimed in claim 1, further comprising a sleeve cap disposed at an end of the moving body and an alignment sleeve positioned within the moving body and enclosed by the sleeve cap.

3. The adjustable attenuation adapter as claimed in claim 1, further comprising a detent for pressing against the inner roller.

4. The adjustable attenuation adapter as claimed in claim 3, further comprising a fixing knob for controlling the position of the detent with respect to the inner roller.

5. The adjustable attenuation adapter as claimed in claim 1, wherein the adjusting knob has a slot formed therein.

6. The adjustable attenuation adapter as claimed in claim 4, wherein the fixing knob has a slot formed therein.

7. The adjustable attenuation adapter as claimed in claim 2, wherein the alignment sleeve has a longitudinal slot for permitting resilient radial expansion and contraction.

8. The adjustable attenuation adapter as claimed in claim 1, wherein a portion of the adjusting knob is exposed through a bottom of the fixing body.

9. A fiber optic variable signal attenuator comprising:

a fixing body having a bore centrally disposed therethrough and a first connecting member extending outwardly from the bore;

a moving body having a cylindrical body with a threaded outer surface and a second connecting member;

an inner roller being disposed within the central bore of the fixing body, the inner roller having an outer surface with a gear teeth and an inner threaded surface for driving the threaded outer surface of the cylindrical body of the moving body;

an adjusting knob disposed within the fixing body and adjacent to the inner roller, the adjusting knob having a gear body for driving the gear teeth of the inner roller;

an alignment sleeve positioned within the moving body;

a first plug element having a first ferrule which is inserted into the alignment sleeve and the first plug element engaged with the first connecting member; and a second plug element having a second ferrule which is inserted into the alignment sleeve and the second plug element engaged with the second connecting member;

wherein the threaded outer surface of the cylindrical body is threadedly driven by the inner threaded surface of the inner roller which is also gearedly rotated by the adjusting knob, the rotation of the adjusting knob causes an axial displacement of the moving body with respect to the fixing body such that the gap between the first ferrule and the second ferrule can be varied to adjust the attenuation therebetween.

10. The fiber optic variable signal attenuator as claimed in claim 9, further comprising a detent for pressing against the inner roller.

11. The fiber optic variable signal attenuator as claimed in claim 9, wherein the adjusting knob has a slot formed therein.

12. The fiber optic variable signal attenuator as claimed in claim 11, wherein the fixing knob has a slot formed therein.

13. The fiber optic variable signal attenuator as claimed in claim 9, further comprising a sleeve cap disposed at an end of the moving body and the alignment sleeve positioned within the moving body and enclosed by the sleeve cap.

14. The fiber optic variable signal attenuator as claimed in claim 13, wherein the alignment sleeve has a longitudinal slot for permitting resilient radial expansion and contraction.

15. The fiber optic variable signal attenuator as claimed in claim 9, wherein a portion of the adjusting knob is exposed through a bottom of the fixing body.

16. An adjustable attenuation adapter comprising:

a fixing body having a bore centrally disposed therethrough and a connecting member extending outwardly from the bore;

a moving body having a cylindrical body with a threaded outer surface; and an adjusting roller being disposed within the central bore of the fixing body, the adjusting roller having an outer surface configured with a gear teeth and an inner threaded surface for driving the threaded outer surface of the cylindrical body of the moving body;

wherein the threaded outer surface of the cylindrical body is threadedly driven by the inner threaded surface of the adjusting roller, the rotation of the adjusting roller causes an axial displacement of the moving body with respect to the fixing body.

17. The adjustable attenuation adapter as claimed in claim 16, further comprising a sleeve cap disposed at an end of the moving body and an alignment sleeve positioned within the moving body and enclosed by the sleeve cap.

18. The adjustable attenuation adapter as claimed in claim 16, further comprising a detent for pressing against the inner roller.

19. The adjustable attenuation adapter as claimed in claim 18, further comprising a fixing knob for controlling the position of the detent with respect to the inner roller.

20. The adjustable attenuation adapter as claimed in claim 16, wherein a portion of the adjusting roller is exposed through the bottoms of the fixing body.

* * * * *